US011670797B2

United States Patent
Pol et al.

(10) Patent No.: US 11,670,797 B2
(45) Date of Patent: Jun. 6, 2023

(54) METAL-ION DEPOSITION REGULATOR FOR SUPPRESSING DENDRITE FORMATION IN ELECTROCHEMICAL CELLS

(71) Applicant: Purdue Research Foundation, West Lafayette, IN (US)

(72) Inventors: Vilas Ganpat Pol, West Lafayette, IN (US); Patrick J H Kim, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 16/228,498

(22) Filed: Dec. 20, 2018

(65) Prior Publication Data
US 2019/0198841 A1    Jun. 27, 2019

Related U.S. Application Data

(60) Provisional application No. 62/609,841, filed on Dec. 22, 2017.

(51) Int. Cl.
*H01M 50/446* (2021.01)
*H01M 50/451* (2021.01)
(Continued)

(52) U.S. Cl.
CPC ....... *H01M 10/052* (2013.01); *H01M 50/414* (2021.01); *H01M 50/417* (2021.01);
(Continued)

(58) Field of Classification Search
CPC ............ H01M 50/414; H01M 50/417; H01M 50/434; H01M 50/44; H01M 50/446;
(Continued)

(56) References Cited

U.S. PATENT DOCUMENTS

2015/0050544 A1* 2/2015 Nam .................... H01M 50/414
429/144
2016/0013463 A1* 1/2016 Roumi .................. H01M 10/48
429/145

(Continued)

*Primary Examiner* — Ula C Ruddock
*Assistant Examiner* — Amanda Rosenbaum
(74) *Attorney, Agent, or Firm* — Purdue Research Foundation

(57) ABSTRACT

A metal-ion deposition regulator to regulate the flux and deposition of metal ions in an electrochemical cell. The regulator containing two membranes made of a polymer and a plurality of two-dimensional porous nanosheets sandwiched between the two membranes. The regulator is capable of distributing flux of metal ions passing through the metal-ion deposition regulator and regulating the deposition of the metal ions onto the cathode or anode thereby suppressing dendrite growth in the electrochemical cell. An electrochemical cell containing an anode, a cathode, a liquid electrolyte, and a metal-ion deposition regulator. A method of making a metal-ion deposition regulator. The method includes fabricating two-dimensional porous nanosheets utilizing graphene oxide as an expendable template, and sandwiching the porous nanosheets between two membranes made of a polymer such that the nanosheets are in contact with the two membranes.

12 Claims, 17 Drawing Sheets

(51) Int. Cl.
*H01M 50/457* (2021.01)
*H01M 50/46* (2021.01)
*H01M 50/489* (2021.01)
*H01M 50/491* (2021.01)
*H01M 10/052* (2010.01)
*H01M 50/44* (2021.01)
*H01M 50/426* (2021.01)
*H01M 50/414* (2021.01)
*H01M 50/417* (2021.01)
*H01M 50/434* (2021.01)

(52) U.S. Cl.
CPC ....... *H01M 50/426* (2021.01); *H01M 50/434* (2021.01); *H01M 50/44* (2021.01); *H01M 50/446* (2021.01); *H01M 50/451* (2021.01); *H01M 50/457* (2021.01); *H01M 50/46* (2021.01); *H01M 50/489* (2021.01); *H01M 50/491* (2021.01)

(58) Field of Classification Search
CPC .. H01M 50/451; H01M 50/457; H01M 50/46; H01M 50/489; H01M 50/491
See application file for complete search history.

(56) References Cited

U.S. PATENT DOCUMENTS

| | | | |
|---|---|---|---|
| 2016/0254511 A1* | 9/2016 | Hatta | B60L 58/12 307/10.1 |
| 2016/0254528 A1* | 9/2016 | Yu | C01G 49/0072 429/188 |
| 2016/0276712 A1* | 9/2016 | Sale | B32B 37/0023 |
| 2017/0092975 A1* | 3/2017 | Kim | H01M 4/382 |
| 2018/0309109 A1* | 10/2018 | Kim | H01M 4/13 |

* cited by examiner

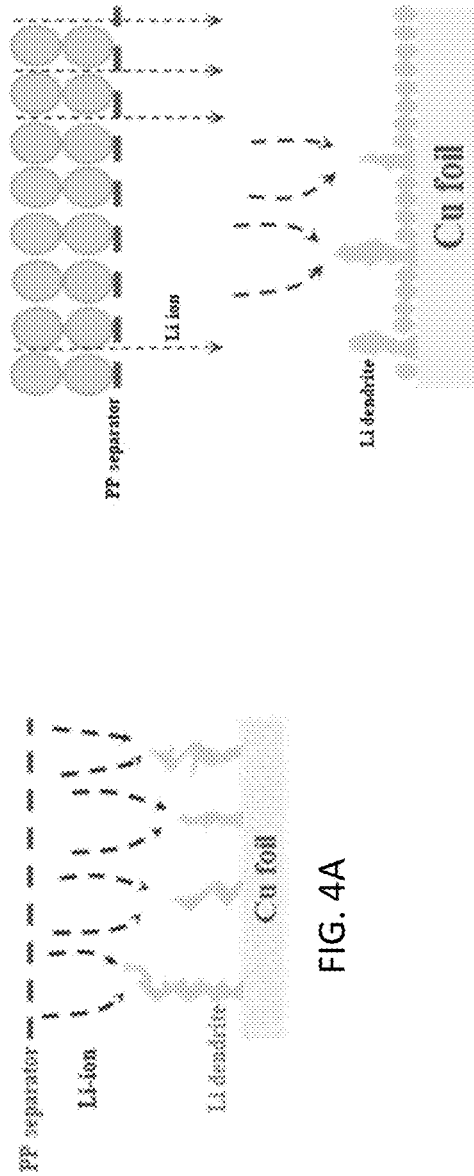
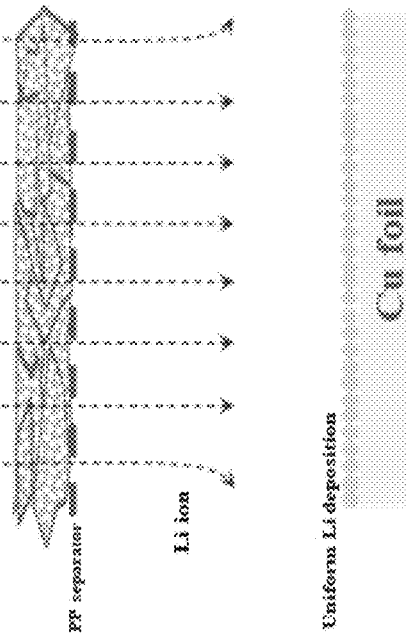
FIG. 4A
FIG. 4B
FIG. 4C

PP separator

PP separator with SiO$_2$ nanospheres

PP separator with SiO$_2$ nanosheets

PP separator

PP separator with SiO$_2$ nanospheres

PP separator with SiO$_2$ nanosheets

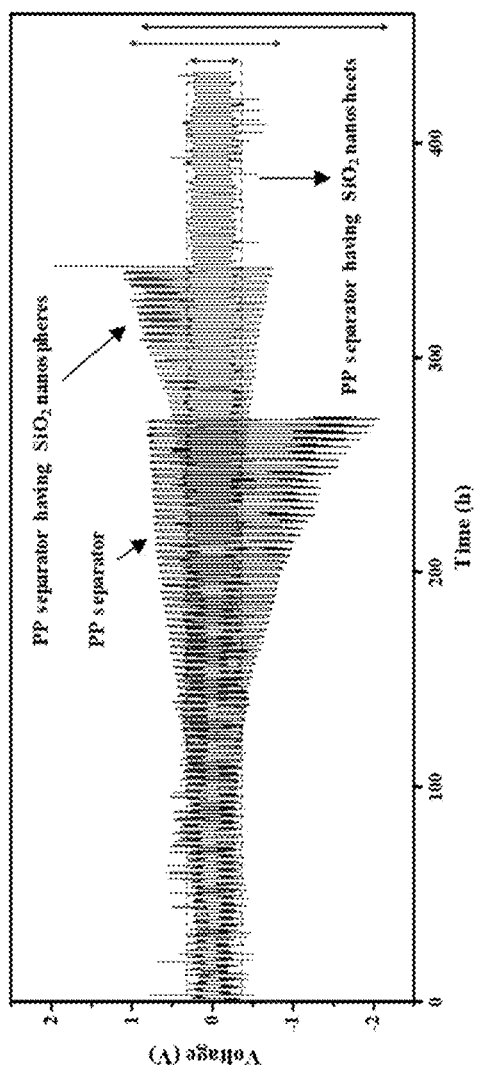
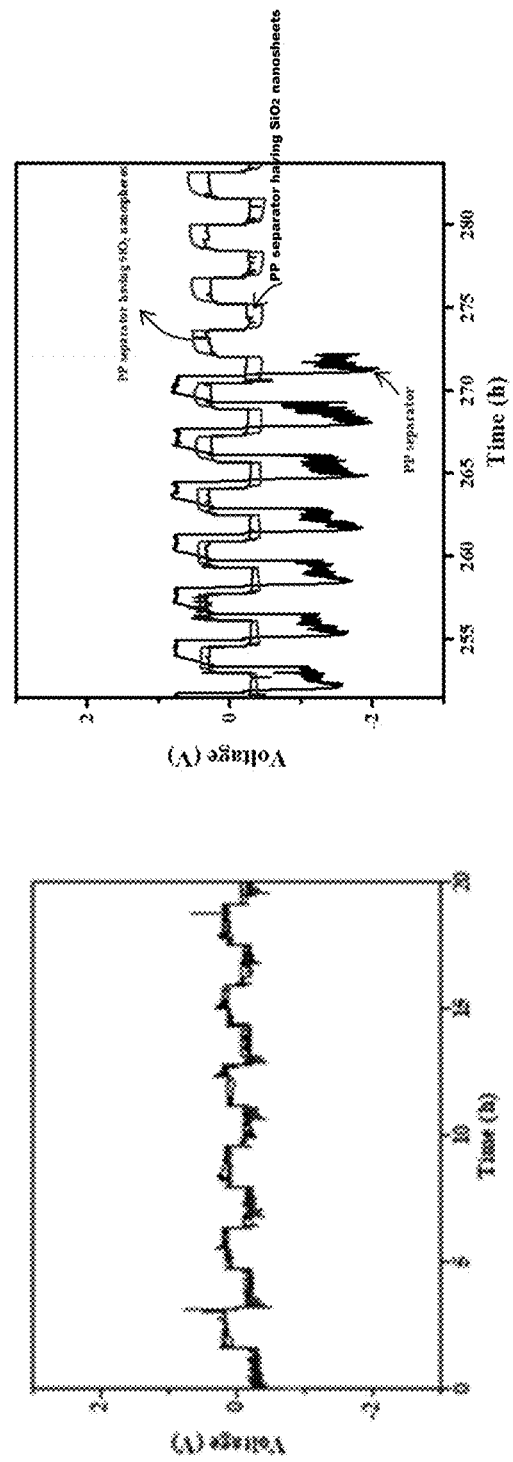
FIG. 5A
FIG. 5B
FIG. 5C

METAL-ION DEPOSITION REGULATOR FOR SUPPRESSING DENDRITE FORMATION IN ELECTROCHEMICAL CELLS

CROSS-REFERENCE TO RELATED APPLICATIONS

The present U.S. patent application is related to and claims the priority benefit of U.S. Provisional Patent Application Ser. No. 62/609,841, filed Dec. 22, 2017, the contents of which are hereby incorporated by reference in their entirety into the present disclosure.

STATEMENT REGARDING GOVERNMENT FUNDING

This invention was made with government support under DE-EE0006832 awarded by the Department of Energy. The government has certain rights in the invention.

TECHNICAL FIELD

The present application relates to suppression of undesirable dendrite formation in electrochemical cells, especially in Li metal batteries.

BACKGROUND

This section introduces aspects that may help facilitate a better understanding of the disclosure. Accordingly, these statements are to be read in this light and are not to be understood as admissions about what is or is not prior art.

As high performing electronic devices, such as cell phone, electric vehicle (EV) etc., are prevalently utilized in our lives, the demand for secondary batteries with high energy density, enhanced safety and long cycle life has highly increased. Previous anode studies, based upon the graphite or alloy materials (Si, Sn, and etc.), showed promising electrochemical performances and were substantially applied to the commercial battery market. However, these materials inherently have systemic limitations in achieving high energy density at a reasonable price. To tackle the fundamental challenges of previous battery systems, metallic Li electrode has been re-spotlighted as a next-generation anode due to its high theoretical specific energy (3860 mAh $g^{-1}$), the lowest electrochemical potential (−3.04 V vs. Standard Hydrogen Electrode), and low density (0.534 g $cm^{-3}$). In addition, a Li metal anode can be coupled with advanced energy storage systems such as Li—S batteries and Li-air batteries, both of which are being intensively explored as next-generation batteries. However, the formation of lithium dendrites, which are derived from the decomposition of electrolytes and lithium salts, induces the safety hazard (e.g. short circuit) and low Coulombic efficiency during repetitive discharge-charge cycles; this hinders the practical utilization of Li metal anode in rechargeable batteries. The solid electrolyte interphase (SEI) layer, which is formed by contact with organic-based electrolytes, is known to play significant roles for stabilizing the surface of anode as a passivation layer and facilitating improved cyclability of lithium ion batteries (LIBs). However, since Li metal anode as a "hostless electrode", it can virtually be expanded unlimitedly during repetitive cycles. Many hot-spots where the rate for Li deposition and extraction are aggressive and fast can be generated and consequently lead to the formation of localized regions with extremely high volumetric changes. These serious volumetric changes sequentially induce the strain and stress on the intrinsically brittle solid electrolyte interphase (SEI) layer, thus resulting in the formation of cracks and perforations through the passivation layer. Such drastic physical defects, derived from the breakage of SEI layer, create intense local Li-ion flux and consequently boost the formation of dendritic and mossy Li via intrinsically non-uniform deposition; this leads to the failure of batteries.

In order to address the issues associated with unstable properties of Li metal electrode, many strategies have been explored: a) introduction of electrolyte additives in liquid electrolytes, b) direct coating of Li metal with inorganic materials ($Al_2O_3$, $Cu_3N$, $Li_3PO_4$, etc.), and c) modification of a separator incorporating other materials into the separator. One of representative approaches is the utilization of electrolyte additives in order to chemically stabilize the SEI layer and reduce the decomposition of electrolyte. It showed promising results in stabilizing the Li metal and achieving high cyclability; but, in the long term, it was still unable to avoid the Li dendritic growth due to the inherent brittleness of SEI layer and huge volumetric changes of Li metal electrode. In a different way, the direct interfacial modification of Li metal with inorganic materials addressed lots of challenges associated with Li metal anodes; but, due to the low ionic conductivity of inorganic materials, it still has critical problems in solving low power output and high polarization. In addition, inorganic materials are in principle unable to actively adapt their shape to the changing shape of Li metal electrodes during operation of the elkctriochelcial cell owing to their strong rigidity; in the end, this weakens the interfacial stabilities between Li metal electrode and inorganic layer. Above-mentioned strategic approaches have shown promising results in suppressing Li dendritic growth and thus leading to stable cycle performances with high Coulombic efficiencies. However, each step of preparing an inorganic layer on a surface of the Li metal anode and optimizing the electrolyte with additives requires elaborate techniques; therefore, it hinders practical use of Li metal electrodes in commercial market. Hence separator modifications reported have met with only limited success.

Hence there is an unmet need for techniques which are simpler to implement and which can prevent dendrite formation by regulating metal ion transfer and deposition across the electrodes, thereby limiting dendritic growth attributable to metal ion deposition on cathode Li metal anode in an electrochemical cell using Li metal anode.

SUMMARY

A metal-ion deposition regulator to regulate the flux and deposition of metal ions in an electrochemical cell is disclosed. The metal-ion deposition regulator includes a separator containing two membranes made of a polymer and a plurality of two-dimensional porous nanosheets sandwiched between the two membranes. The separator then forms a metal-ion deposition regulator capable of distributing flux of metal ions passing through the separator and regulating the deposition of the metal ions onto an electrode of an electrochemical cell.

An electrochemical cell is disclosed. The electrochemical cell contains an anode; a cathode; a liquid electrolyte; and a metal-ion deposition regulator containing two membranes and a plurality of two-dimensional porous nanosheets sandwiched between the two membranes, wherein the metal-ion deposition regulator is capable of distributing flux of metal ions passing through the metal-ion deposition regulator and regulating the deposition of the metal ions onto the cathode or anode thereby suppressing dendrite growth in the electrochemical cell.

A method of making a metal-ion deposition regulator to regulate the flux and deposition of metal ions in an electrochemical cell is disclosed. The method includes the steps of: dispersing graphene oxide particles into a mixture of deionized water and ethanol (for example by sonication); adding a silicon-containing inorganic material and quantity of a bonding agent to promote bonding between the graphene oxide particles and the silicon-containing inorganic material to form a suspension containing the graphene oxide particles, silicon-containing inorganic material, water, and the bonding agent; adding ammonia solution to the suspension causing precipitation of a composite containing the graphene oxide particles, silicon-containing inorganic material and the bonding agent; extracting the composite by removing the ammonia solution and water; centrifuging the suspension containing the precipitate, water and ammonia; drying the composite to form a dry composite; heating the dry composite to a temperature range of 500-800 C for 6-24 hours resulting in the removal of the graphene oxide leaving behind porous nanosheets of silicon dioxide; mixing the nanosheets with a polymeric binder and an organic solvent to result in a slurry; coating a first membrane made of a polymer with the slurry; heating the first membrane coated with the slurry in at temperature range of 30-50° C. for 4-24 hours to form dried porous nanosheets attached to the first membrane made of a polymer; and sandwiching the dried porous nanosheets between the first membrane made of a polymer and a second membrane made of a polymer to be in contact with the two membranes.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

FIGS. 4A through 4C show schematic diagrams to illustrate the behavior of Li-ion deposition to Cu foil through unmodified PP separator, $SiO_2$ nanosphere/separator, and $SiO_2$ nanosheet/separator, respectively.

FIG. 5A shows long-term cyclability of symmetrical Na cells with different separators.

FIGS. 5B and 5C show zoomed-in images (with reference to FIG. 5A) of voltage profile near the beginning and after 250 h respectively.

DETAILED DESCRIPTION

Figure 1A:
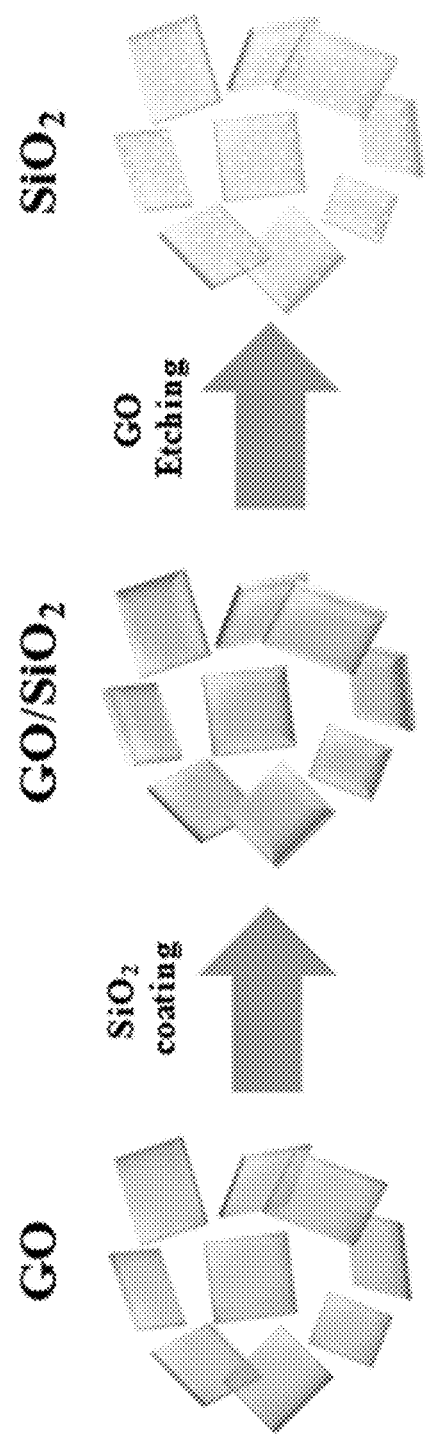
FIG. 1A shows a schematic illustration for the bottom-up synthesis of ultrathin $SiO_2$ nanosheets by replicating graphene oxide (GO) templates.

For the purposes of promoting an understanding of the principles of the disclosure, reference will now be made to the embodiments illustrated in the drawings and specific language will be used to describe the same. It will nevertheless be understood that no limitation of the scope of the This disclosure describes a design of a multifunctional membrane, comprising nanoporous $SiO_2$ nanosheet layer, in order to uniformly control/regulate the Li-ion flux and delay the penetration of Li dendrites through the separator. When a membrane designed and tailored by the concepts of this disclosure was employed, the propagation of Li dendrites against the separator was dramatically restrained and suppressed by structural and materialistic benefits of $SiO_2$ nanosheets. This led to significant enhancement of electrochemical performances of Li metal batteries Similar to their deployment in batteries employing a Li metal anode, the membranes of this disclosure showed analogous promising results and possibilities in achieving high electrochemical stabilities and cycle performances when deployed with Na metal anode batteries. Moreover, Li—S prototype cell coupled with designed SiO$_2$ nanosheet membrane delivered stable cycle retention (over 400 cycles) with high Coulombic efficiency by selectively allowing Li ions to pass through membrane but preventing the migration of polysulfides.

In experiments to leading to this disclosure, a multifunctional membrane was designed in order to uniformly control the metal-ion deposition and delay the penetration of Li dendrites through the separator and, in the long run, extend the lifetime of Li metal batteries via a simple and effective way. The membrane was fabricated by laminating ultrathin and nanoporous SiO$_2$ nanosheets onto the conventional separator (Celgard 2500) via tape-casting. SiO$_2$ nanospheres have been previously explored for the membrane and demonstrated promising results in achieving long term cycle stabilities. A modification of the separator as described in this disclosure has been proven in experiments leading to this disclosure to have the capability to operate the Li-metal anode longer than conventional separators, such as a polyethylene separator, with no modifications. This performance is mainly attributed to the advantages of SiO$_2$ nanomaterials: a) reinforcement of mechanical strength to the separator, b) improvement of electrolyte wettability, and c) consumption of Li dendrites by electrochemical reactions. Along with the advantages of SiO$_2$ nanoparticles mentioned above, ultrathin SiO$_2$ nanosheets can be critical part of a metal-ion deposition regulator by controlling the the Li (or Na in the case of Na metal anodes) ion flux and act as effective barriers by drastically restraining the propagation of Li (or Na) dendrites against counter electrode (Cu foil, for example)) as well as helping uniform deposition of Li (or Na) ions on the counter electrode. For purposes of this disclosure, a metal-ion deposition regulator is to be understood as a membrane that has the capability to control the metal-ion flux from a metal anode in an electrochemical cell. In this disclosure, the metal-ion deposition regulator is sometimes simply referred to as the regulator. The metal-ion deposition regulator of this disclosure is also a metal-ion flux regulator as it regulates the flux of metal ions (such as Li ions and Na ions) across the regulator. The regulator of this disclosure comprises nanosheets of SiO$_2$ and regulates ion flux through nanopores of SiO$_2$ nanosheet and enables a uniform deposition and extraction of the metal ions during repeated charge/discharge cycles of the electrochemical cell. With the aid of these materialistic and structural benefits of SiO$_2$ nanosheets, the cycle performances and Coulombic efficiencies of Li metal batteries were significantly improved in comparison to conventional separator and SiO$_2$ nanosphere-coated membrane (denoted as a SiO$_2$ nanosphere/separator). To further explore the potential possibilities of our designed membrane to different energy storage systems, Na metal batteries and Li—S batteries were evaluated with a regulator membrane and showed excellent electrochemical performances and stabilities.

Figure 1B:
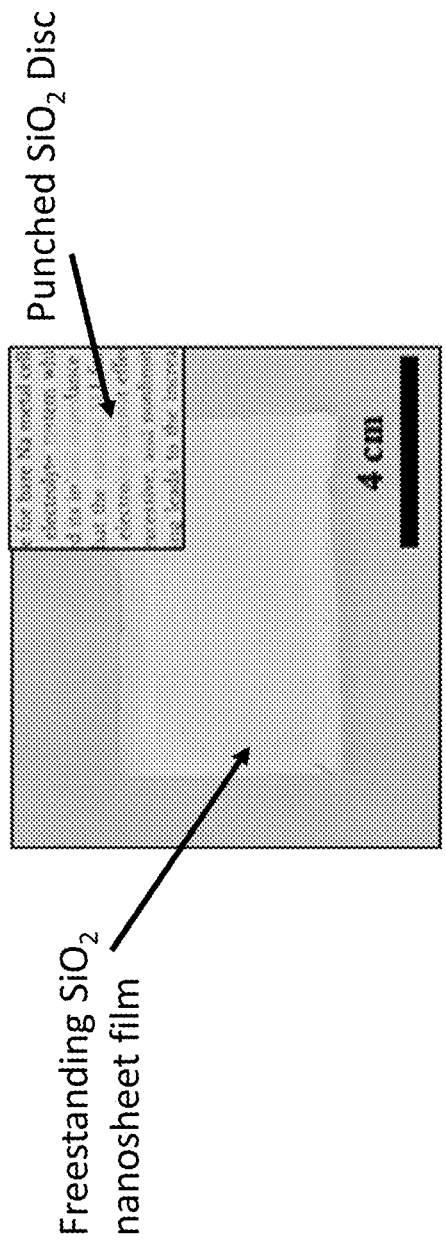
FIG. 1B shows images of a freestanding $SiO_2$ nanosheet film and a punched $SiO_2$ nanosheet disc (inset)
Figure 1E:
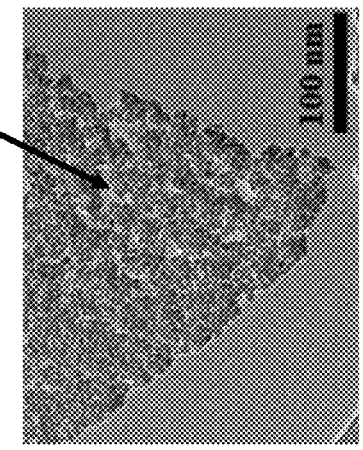
FIG. 1E shows TEM image of a $SiO_2$ nanosheet of this disclosure.
Figure 1D:
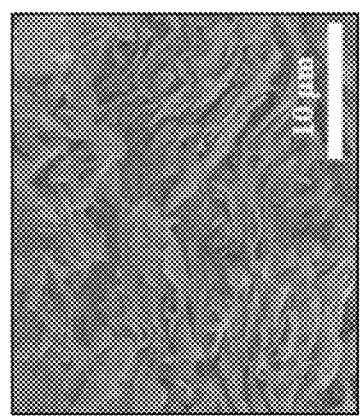
FIG. 1D shows SEM image of a cross-sectional view of the $SiO_2$ nanosheet of this disclosure.
Figure 1C:
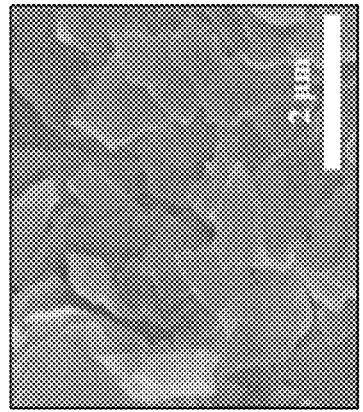
FIG. 1C shows SEM image of a top view of the $SiO_2$ nanosheet of this disclosure.
Figure 1F:
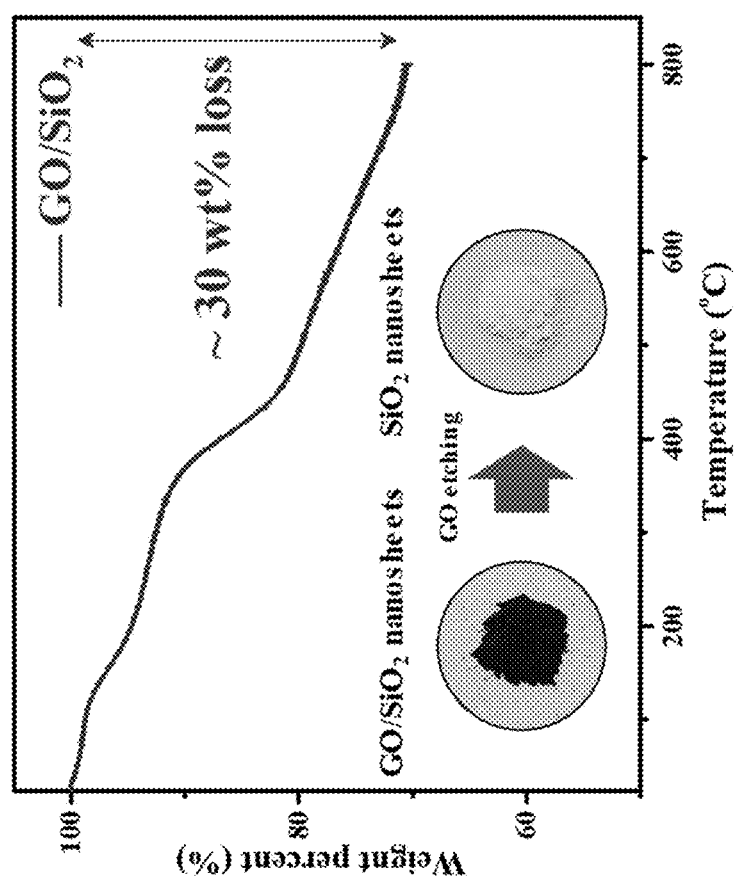
FIG. 1F shows TGA analysis for $GO/SiO_2$ nanosheet.
Figure 1G:
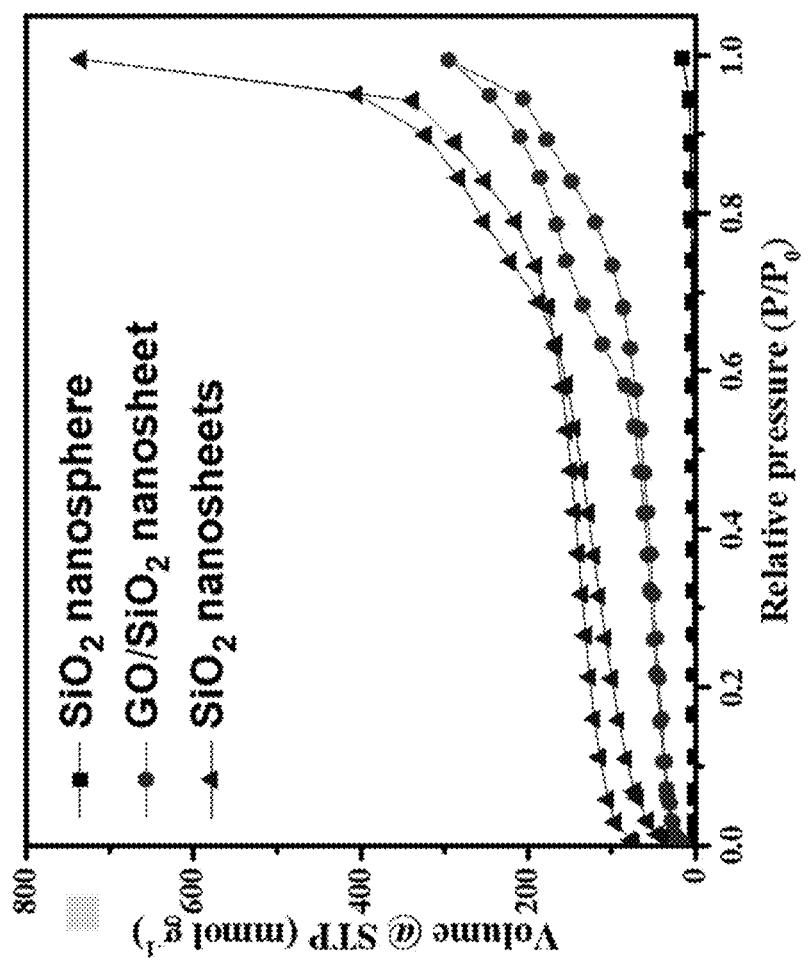
FIG. 1G shows BET analysis of the regulator membranes of this disclosure. These are the data for $SiO_2$ nanosphere, $GO/SiO_2$ nanosheet, and $SiO_2$ nanosheet (after removing the GO (core material) from $GO/SiO_2$ nanosheet).

FIG. 1A shows a schematic illustration of the synthesis utilized in this disclosure, of ultrathin SiO$_2$ nanosheets by replicating graphene oxide (GO) templates. In the first step, GO sheets are dispersed in ethanol/DI water solution, followed by depositing SiO$_2$ layer onto the surface of GO via hydrolysis and condensation of tetraethyl orthosilicate (TEOS). Then, GO templates are etched from GO/SiO$_2$ nanosheets by thermal oxidation at 600° C., which results in the formation of nanoporous, ultrathin, and semi-transparent SiO$_2$ nanosheets. FIGS. 1B through 1G show characterization of the SiO$_2$ nanosheets of this study, made by the schemes shown in FIG. 1A. FIG. 1B shows photographs of a freestanding SiO$_2$ nanosheet film and a punched SiO$_2$ disc from an SiO$_2$ sheet placed on a paper containing printed letters (inset image). The punched SiO$_2$ disc demonstrated that the strong mechanical properties mainly originated from GO templates and also demonstrated the transparent behavior of the disc and hence the sheets. The size and transparency of a freestanding SiO$_2$ nanosheet film can be modulated by controlling the concentration of aqueous GO/SiO$_2$ nanosheets solution before drying. FIGS. 1C and 1D present top and cross-sectional SEM images respectively of a freestanding SiO$_2$ nanosheet film. The structure of SiO$_2$ nanosheets with diameters of around 1 µm are well stacked layer by layer to form a freestanding film. In order to characterize the morphology of a SiO$_2$ nanosheet, transmission electron microscopy (TEM) study was carried out and presented in FIG. 1E. The microstructure of SiO$_2$ nanosheet shows plenty of pores with the size of around 20 nm through the surface, which can be clearly distinguished by the TEM image. The white areas in FIG. 1E are the nanopores. For calculating the ratio of GO to GO/SiO$_2$, a freestanding GO/SiO$_2$ film was ground and examined by thermo-gravimetric analysis (TGA). As shown in FIG. 1F, approximately 30 wt % of GO templates are included and 70 wt % of SiO$_2$ nanosheets are presented in GO/SiO$_2$ nanosheets. As shown in the inset image in FIG. 1F, the color of GO/SiO$_2$ powder changed from black to white, indicating the successful removal of GO templates from GO/SiO$_2$ nanosheets after etching away of GO as indicated in the SiO$_2$ synthesis method described in FIG. 1A. In order to investigate the specific surface area and pore size of each material, Brunauer Emmett Teller (BET) analysis was carried out and nitrogen adsorption/desorption isotherm curves of each sample are plotted in FIG. 1G of this description. The specific surface areas of derived from FIG. 1G for SiO$_2$ nanosphere, GO/SiO$_2$ nanosheet, and SiO$_2$ nanosheet are 7.4 m$^2$g$^{-1}$, 153.7 m$^2$g$^{-1}$, and 238.9 m$^2$g$^{-1}$, respectively. The specific surface area of SiO$_2$ nanosheets increased from 153.7 m$^2$ g$^{-1}$ to 238.9 m$^2$ g$^{-1}$ after the removal of GO templates from GO/SiO$_2$ nanosheets, indicating the formation of pores and spaces inside the SiO$_2$ nanosheet structure, which was already confirmed by the TEM image (FIG. 1E). It was further confirmed by the pore size distribution of each sample that pores ranging from 10 to 15 nm were generated after removal of GO from GO/SiO$_2$ In case of SiO$_2$ nanosphere, the specific surface area is as low as 7.4 m$^2$ g$^{-1}$. To characterize the crystalline phase of each SiO$_2$ nanosphere and SiO$_2$ nanosheet, XRD analyses were performed and the X-Ray Diffraction (XRD) patterns showed analogous patterns, implying that both materials, namely SiO$_2$ nanosphere and SiO$_2$ nanosheet have the same crystalline phase.

Figure 2A:
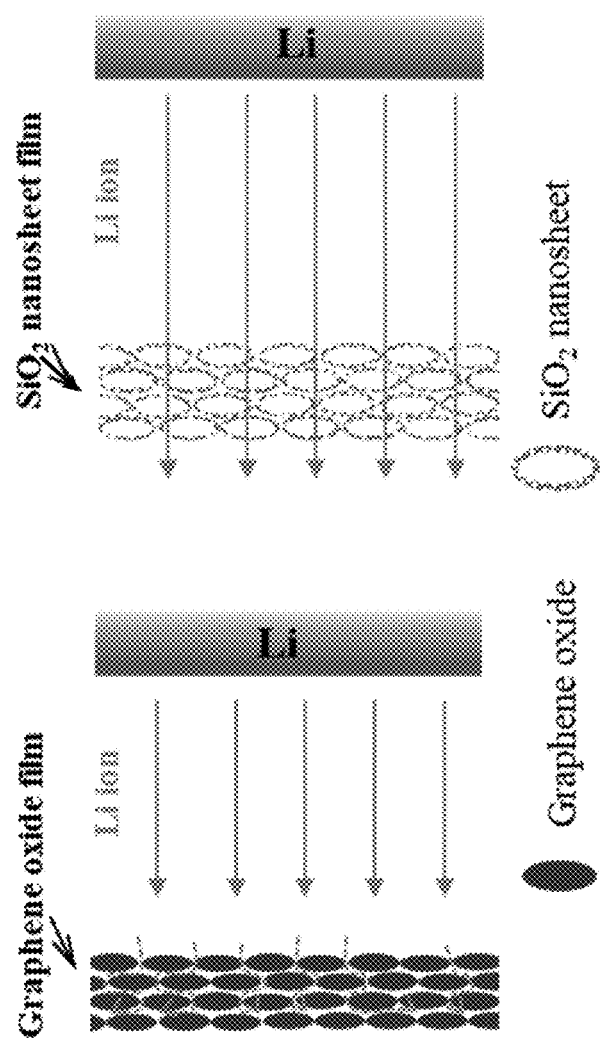
FIG. 2A shows a schematic to illustrate the characteristic of freestanding Graphene oxide (GO) and $SiO_2$ nanosheet films in terms of Li-ion diffusivity.

FIG. 2A illustrates the behaviors of a Graphene oxide (GO) film and a SiO$_2$ nanosheet film during the electrochemical reaction. The graphene oxide film (each back oval shaped form shown in FIG. 2A) with a pore-less and compact architecture impedes the efficient migration of ions through GO film, causes interference of ion diffusion throughout the film, resulting in poor utilization of entire electrode. On the other hand, a freestanding SiO$_2$ nanosheet film shown in FIG. 2A as ovals contains pores shown as white dots. The SiO$_2$ nanosheets in FIG. 2A were replicated from the structure of GO scaffolds, and contain plenty of pores arising out the process used to make them and spaces in the film; this facilitates efficient ion permeation throughout the membrane.

Figure 2C:
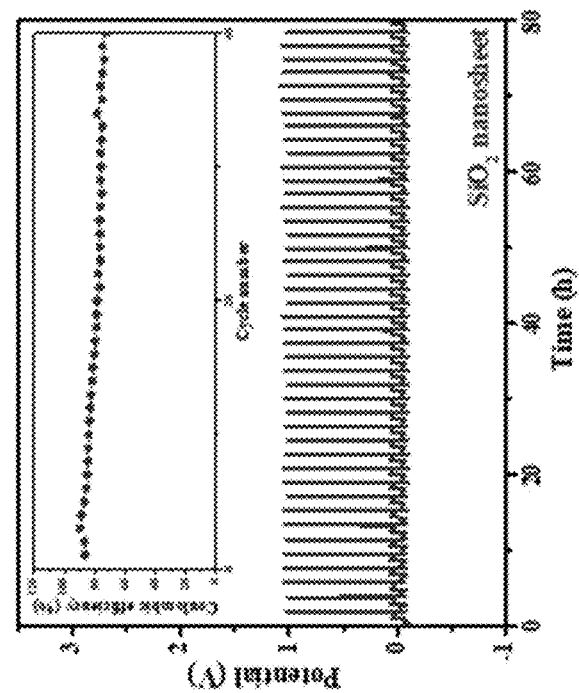
FIG. 2C shows Li deposition and extraction cycle tests with a $SiO_2$ nanosheet film. Each cell was tested at a current density of 1 mA $cm^{-1}$ and the capacity of Li deposition was set to 1 mAh $cm^{-1}$.
Figure 2B:
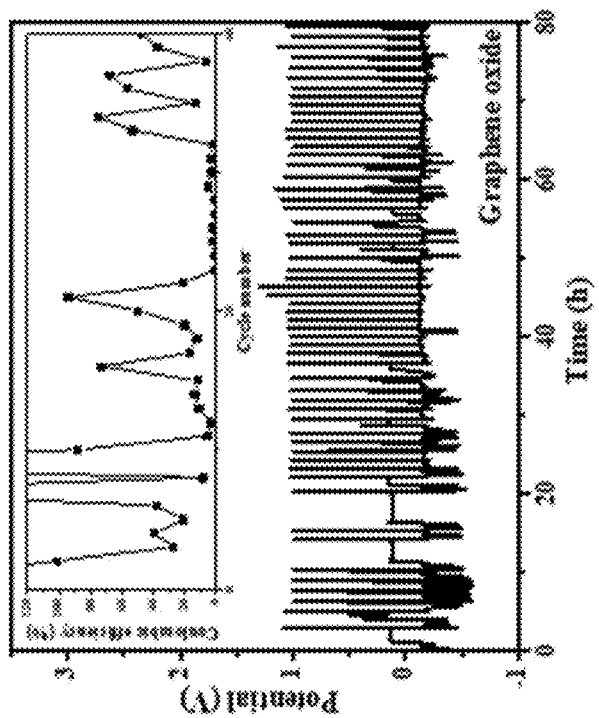
FIG. 2B shows results of Li deposition and extraction cycle tests with a GO film and each cell was tested at a current density of 1 mA $cm^{-1}$ and the capacity of Li deposition was set to 1 mAh $cm^{-1}$.

FIG. 2B shows the data of Li deposition/extraction in an electrochemical cell employing a metal anode for GO film and FIG. 2C shows the data of Li deposition/extraction/for SiO$_2$ nanosheet film. From FIGS. 2B and 2C it can be seen that that GO film is not an effective membrane to allow Li ions to pass throughout the film, and that the Li/Cu cell with a GO film operated unsteadily during the charge/discharge cycles because of unfavorable Li ion diffusion throughout the compact layered structure of GO. In contrast, the Li/Cu cell with a $SiO_2$ nanosheet film showed stable operation for Li deposition and extraction with high Coulombic efficiency, indicating excellent diffusion of Li ion throughout the film.

In the experiments leading to this disclosure, in order to prove the structural benefits of ultrathin and nanoporous $SiO_2$ nanosheets, 12 mm diameter films of both GO and $SiO_2$ nanosheet films were fabricated, and tested in electrochemical cells utilizing a Li metal anode. The Li metal deposition-extraction tests were conducted in a Li/Cu cell, where each freestanding film was inserted in-between two conventional polypropylene (PP) separators in order to prevent the direct contact from Cu foil and Li foil. Each cell with a GO film and a $SiO_2$ nanosheet film was evaluated at the same current density of 1 $mA\ cm^{-1}$ to compare the efficiency and stability of Li metal deposition and extraction test. As expected from our hypothesis that GO film is not an effective membrane to allow Li ions to pass throughout the film, the Li/Cu cell with a GO film operated unsteadily during the whole cycles because of unfavorable Li ion diffusion throughout the compact layered structure of GO. In contrast, the Li/Cu cell utilizing a $SiO_2$ nanosheet film as part of a separator showed stable operation for Li deposition and extraction with high Coulombic efficiency, indicating excellent diffusion of Li ion throughout the film. These electrochemical results clearly demonstrate that nanoporous $SiO_2$ nanosheets have favorable microstructures to efficiently diffuse Li ions back and forth even through a $SiO_2$ nanosheet film has compact layered architecture. Generally, graphene oxide film does not have adequate porosity in the structure, and hence impedes the Li ion migration back and forth daring charge/discharge cycles. On the other hand, $SiO_2$ nanosheet film of this disclosure replicated from the GO film is able to transport the Li ion back and forth efficiently, because of the adequate porosity on the surface of the Li metal anode with a separator containing $SiO_2$ nanosheet structure.

Figure 3A:
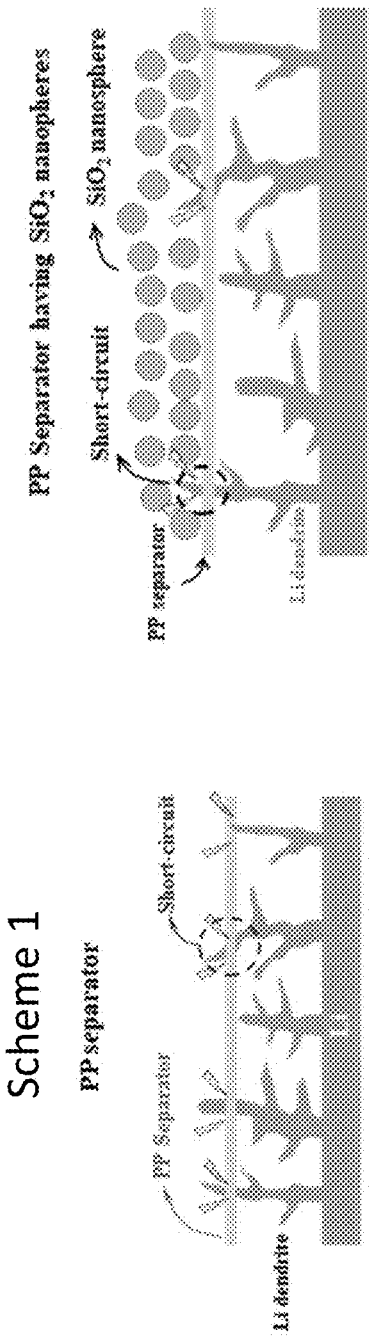
FIG. 3A is a schematic illustration explaining the role of each separator on protecting the cell from the Li dendrites in terms of different architectures.
Figure 3C:
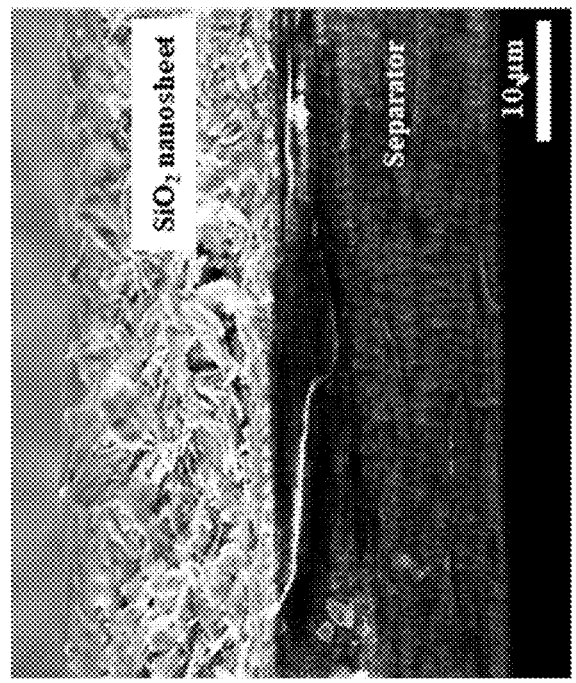
FIG. 3C shows a cross-sectional SEM image of a $SiO_2$ nanosheet/separator.
Figure 3B:
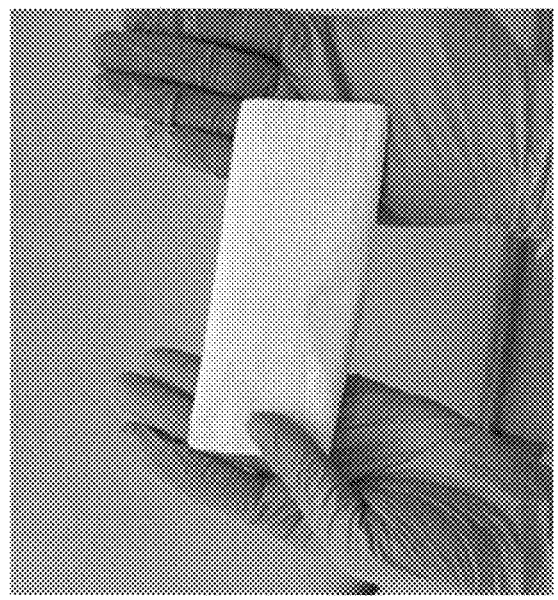
FIG. 3B shows a large-scale $SiO_2$ nanosheet/separator.
Figure 3D:
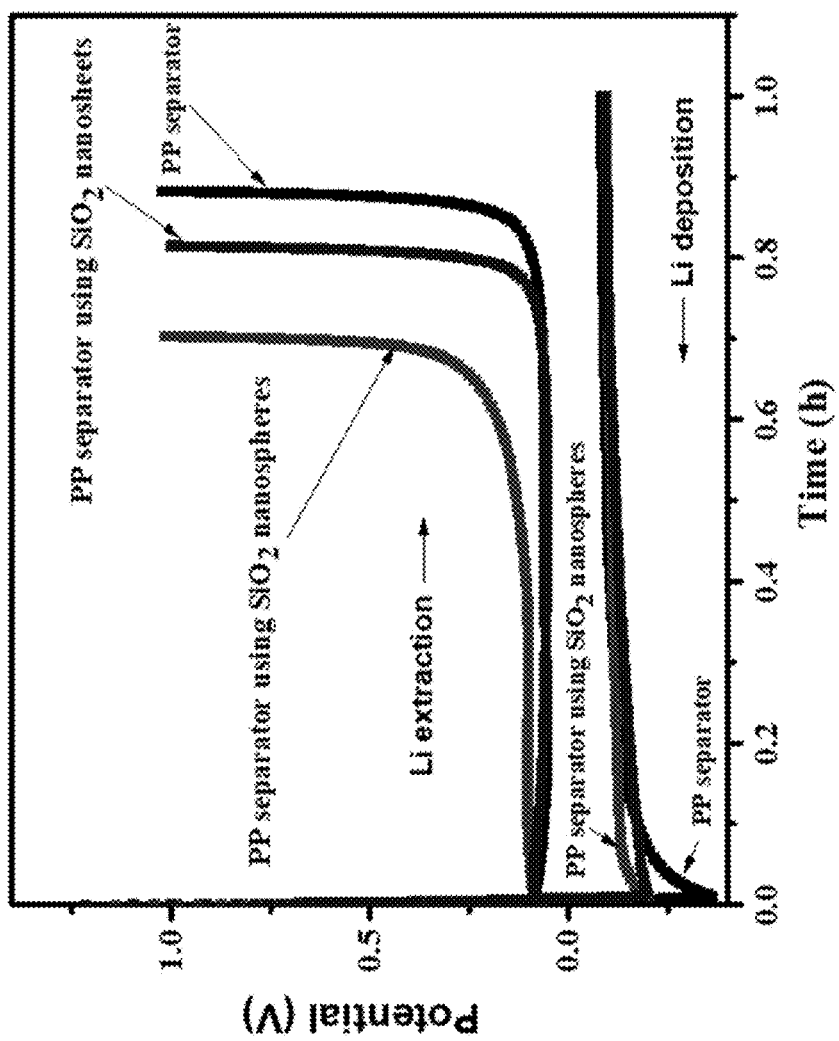
FIGS. 3D and 3E show initial potential profiles and cycle performances respectively of each electrode with different separators at a current density of 1 mA $cm^2$.

FIGS. 3A through 3D illustrate the role of each type of separator. FIG. 3A shows a schematic illustration of the roles of each type of separator in protecting the cell from mossy and dendritic Li in terms of different architectures. Referring to Scheme 1 in FIG. 3A, the Li metal cell utilizing a polypropylene (PP) separator with no modification is unable to block the propagation of dendritic Li because polymeric separator by itself physically cannot block the migration of sharp and long Li dendrites, which can result in short-circuiting and failure of cell. Referring to Scheme 2 and Scheme 3 in FIG. 3A, introduction of a $SiO_2$ nanosphere layer and $SiO_2$ nanosheet layer sandwiched between two PP separators can physically help to suppress the penetration of Li dendrites and thereby enhance the life cycle of Li metal batteries. Note that in Schemes 2 and 3 shown in FIG. 3A, only one separator is shown. The other separator, which we can call the second separator, used to sandwich the nanospheres or the nanosheets, is not shown. Due to low packing density of nanosphere layer, in comparison with the nanosheet structure, the layer of $SiO_2$ nanosphere with high voids and spaces is systemically weak to prevent the penetration of dendritic protrusions in the long term. On the other hand, $SiO_2$ nanosheet has a favorable structure to obstruct the infiltration of Li filaments and efficiently transport Li ions back and forth due to its ultrathin and nanoporous structure. The separator in Scheme 3 in FIG. 3A, wherein the PP separator was modified was prepared by directly laminating the slurry, composed of PVdF (polyvinylidene fluoride) and $SiO_2$ nanosheet powder, onto the PP separator via a slurry-casting method, which enabled large-scale fabrication of a $SiO_2$ nanosheet with one PP separator with 200 mm long and 100 mm wide as shown in FIG. 3B. The thickness of $SiO_2$ nanosheet-modified separator was revealed by cross sectional SEM image, showing ~17 μm thick of $SiO_2$ nanosheet layer and ~20 μm thick of PP separator (FIG. 3C). In order to validate the substantial protective effect of each separator on the cycle stability of Li metal cell, Li metal deposition and extraction tests were carried out at a current density of 1 $mA\ cm^{-1}$ and plotted in FIGS. 3D and 3E. FIG. 3D displays the initial potential profiles of each electrode with different separators: a) PP separator with no modification, b) PP separator modified with $SiO_2$ nanospheres, c) PP separator modified with $SiO_2$ nanosheets. It should be noted that that the data shown in FIGS. 3D and 3E were obtained utilizing separator described in Schemes 1, 2 and 3 of FIG. 3A. That is separators utilizing nanospheres and nanosheets are sandwich configurations as described in schemes 2 and 3 above. Referring to FIG. 3D, as soon as negative current is applied to the cell, the potential abruptly dropped below 0 V (vs. $Li^+/Li$), implying Li deposition onto Cu foil. When the current is changed reversely, the potential level changed above 0 V (vs. $Li^+/Li$), indicating Li stripping from the Li-deposited Cu foil. The polarization of lithium deposition and extraction for the cell with a $SiO_2$ nano sphere/separator is slightly higher than the other cells (with an unmodified PP separator and with $SiO_2$ nanosheet/separator) due to the increased resistance. On the other hand, the cell with unmodified PP separator and the cell with a PP separator modified with $SiO_2$ nanospheres showed almost similar overpotential, implying that PP separator modified with $SiO_2$ nanosheets hardly affects the charge-transfer resistance between two electrodes.

Figure 3E:
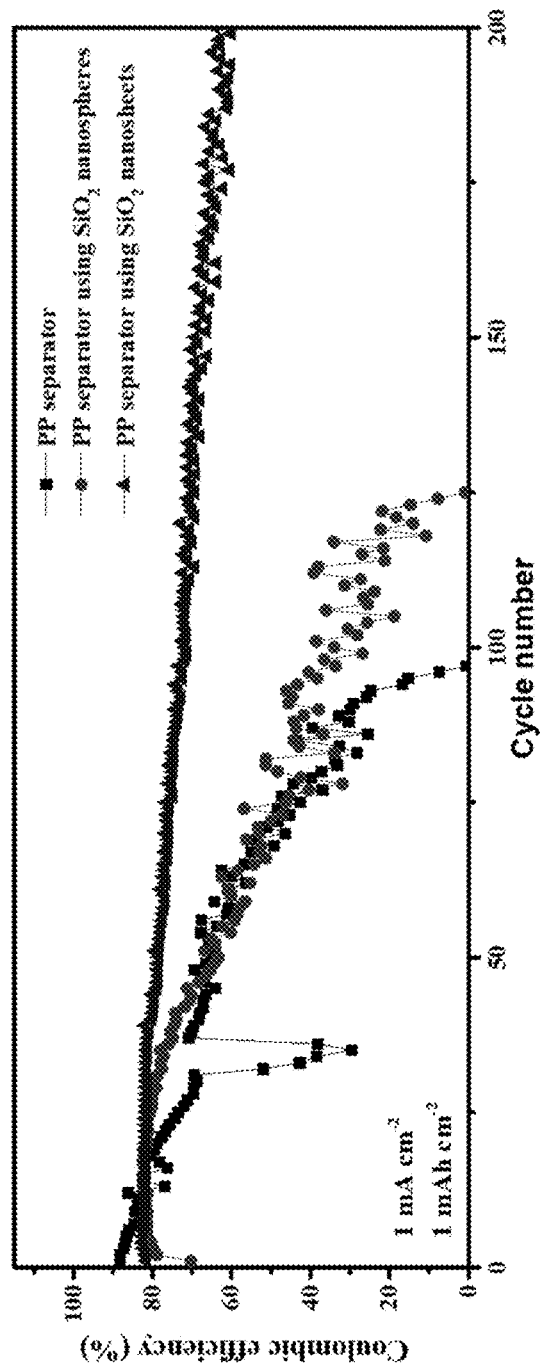

In order to clearly ascertain the stabilities of each electrode, Coulombic efficiencies, defined as the ratio of the amount of stripped Li metal to that of plated Li metal on a Cu foil, were calculated for each cycle and plotted versus cycle number (FIG. 3E). The cell with an unmodified separator showed high Coulombic efficiency for the first few cycles, but started to rapidly decay after 20 cycles and eventually died at 95 cycles due to the internal short circuit of cell. When the $SiO_2$ nanosphere/separator and $SiO_2$ nanosheet/separator were employed, the cycle performances of cells were dramatically improved over 30 cycles, compared to the cell with a unmodified separator, while maintaining the high Coulombic efficiency of 80%. However, separator modified with $SiO_2$ nanosheets delivered high and stable Coulombic efficiency with a small variation during 100 cycles compared to the $SiO_2$ nanosphere/separator. This is attributed to the nanoporous structure of $SiO_2$ nanosheets; because the layer of $SiO_2$ nanosheets facilitates the conformal Li diffusion by filtering out the intense Li-ion flux and, thus, enable the uniform Li deposition and extraction test. On the contrary, the layer of $SiO_2$ nanosphere has large voids and spaces through the entire layer, thus leading to the generation of non-uniform and big Li nucleation sites during repetitive Li deposition/stripping test. In addition, the potential risk for Li dendrites to penetrate across the $SiO_2$ nanosphere/separator is higher than the cell with $SiO_2$ nanosheet/separator with compact structure.

Figure 4D:
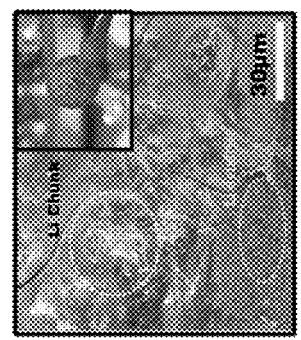
FIGS. 4D through 4F presents photo-images (inset) and SEM images of Cu foil after 20 cycles of Li deposition and extraction test on unmodified PP separator, $SiO_2$ nanosphere/separator, and $SiO_2$ nanosheet/separator, respectively.
Figure 4E:
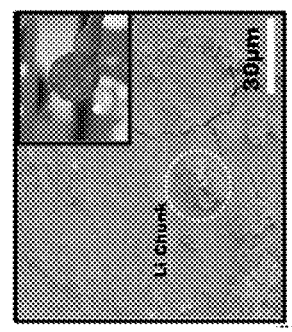
Figure 4F:
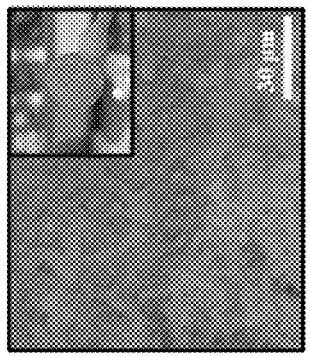
Figure 4G:
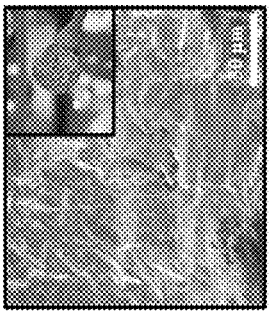
FIGS. 4G through 4I show photo-images and SEM images of Cu foil after 50 cycles of Li deposition and extraction test on unmodified separator, $SiO_2$ nanosphere/separator, and $SiO_2$ nanosheet/separator, respectively.
Figure 4H:
Figure 4I:
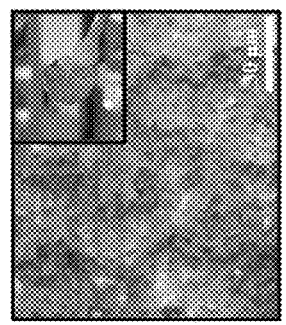

In order to verify the hypothesis that $SiO_2$ nanosheet with nanoporous structure enables the uniform Li deposition and extraction and thus stabilize the interfacial reactions between two electrodes, cells in different cycles (20 cycles and 50 cycles) were evaluated and each cell was disassembled to investigate the morphological changes. FIGS. 4A through 4C show schematic diagrams to illustrate the behavior of Li-ion deposition to a Cu foil through unmodified PP separator, separator modified by $SiO_2$ nanospheres, and separator modified by $SiO_2$ nanosheets, respectively. FIGS. 4D through 4F presents photo-images and SEM images of Cu foil after 20 cycles of Li deposition and extraction test on unmodified separator, separator modified by $SiO_2$ nanospheres, and separator modified by $SiO_2$ nanosheets, respectively. In case of the Cu foil tested with an unmodified PP separator (FIG. 4D), irregular and non-uniform Li chunks are distributed over the localized and limited area of electrode, which is ascribed to the uncontrollable Li-ion flux by an unmodified separator. In contrast, the Cu foils evaluated with a separator modified by $SiO_2$ nanospheres (FIG. 4E) and a separator modified by $SiO_2$ nanosheets (FIG. 4F) showed more uniform distribution of Li layers on the surface of electrodes, indicating better controllability of Li deposition and extraction onto the counter electrode in comparison to the cell with a unmodified separator. Especially on the Cu foil with a separator modified by $SiO_2$ nanosheets, it showed bright color with better morphological uniformity in comparison with the Cu foil with a separator modified by $SiO_2$ nanosheets on the Cu foil after 20 cycles of Li deposition and extraction (FIG. 4F). This implies that nanoporosity of $SiO_2$ nanosheets with high surface area helps to facilitate uniform Li-ion flux through the membrane and leads to better controllability over Li deposition and extraction test. These results also are consistent with 50 cycles of Li deposition and extraction. The cell with a $SiO_2$ nanosheet/separator demonstrated uniform and regular Li deposition layer on the Cu foil (FIG. 4I), whereas other two cells, namely the cell with a PP separator and the cell using a PP separator modified with $SiO_2$ nanosphere define the cells showed irregular and dark morphologies on the Cu foils after 50 cycles of Li deposition and extraction. (FIGS. 4G and 4H).

Figure 4K:
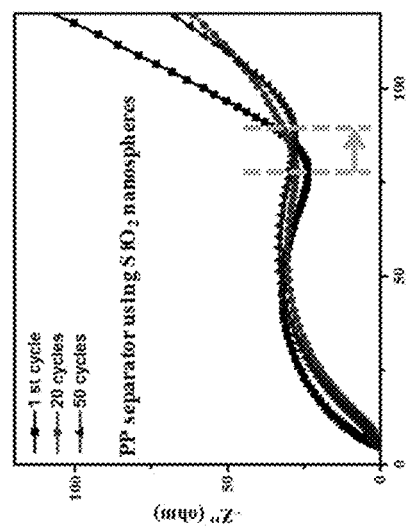
FIGS. 4J through 4L show results of EIS studies of cell with different separators as labeled with different cycles.
Figure 4J:
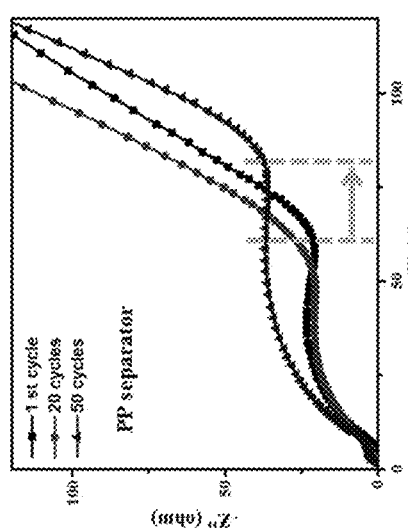
Figure 4L:
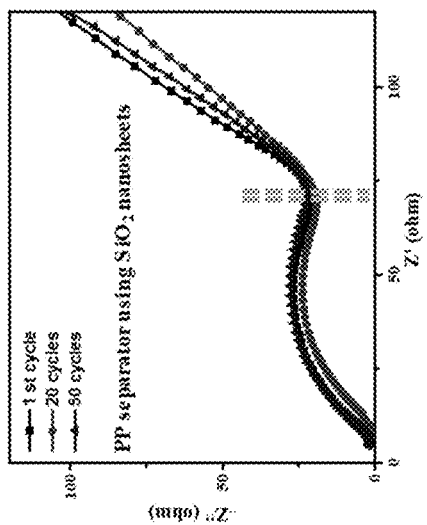

Depletion of electrolyte, one of factors associated with dendritic Li growth, is highly affected by the collapse/reconstruction of SEI layer; this results in the increase of interfacial resistance between electrodes during repetitive cycles. To ascertain the effect of Li-ion flux controllability on the interfacial resistances when modified separators are employed, electrochemical impedance spectroscopy (EIS) studies were performed before disassembling each cell and compared in FIGS. 4J-4L. As shown in FIG. 4J, the charge transfer resistance, defined by the diameter of semicircle, of the cell with a unmodified separator showed the lowest polarization value but unstable fluctuation during repetitive cycles, which is attributed to the drastic growth of Li dendrites by the depletion of electrolyte. In contrary, the cell with a separator modified by $SiO_2$ nanosheets showed an increased charge transfer resistance due to insulating property of $SiO_2$ nanosheet layer but little changes in diameter of Nyquist curves during cycles (FIG. 4L). This is mainly attributed to the uniform Li extraction and deposition through a regulator membrane and the effective delay of Li dendrite growth by the structural benefits of two-dimensional $SiO_2$ nanosheet. The $SiO_2$ nanosheets of this disclosure can be termed two-dimensional $SiO_2$ nanosheets for proses of this disclosure due to the thinness (5-40 nm) and planar nature. In case of separator modified by $SiO_2$ nano sphere, the charge transfer resistance increased a bit but showed relatively consistent curve in comparison with the cell with an unmodified separator (FIG. 4K); however, as can be expected from the above result, it has less controllability over Li deposition and extraction than the cell with a separator modified by $SiO_2$ nanosheet, thus contributing to the increase of interfacial resistance and unstable electrochemical reactions of Li metal cell during cycles.

Figure 5E:
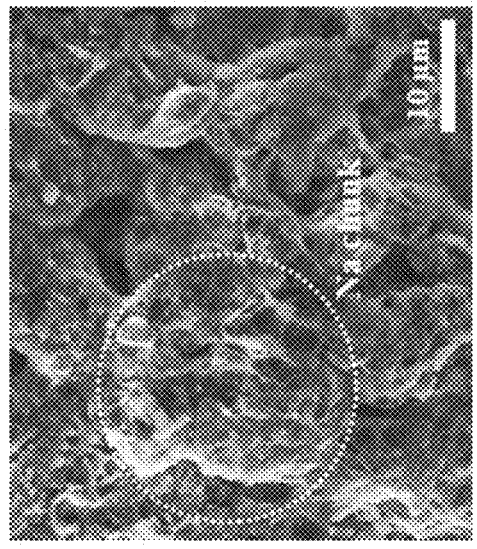
FIGS. 5D through 5F show SEM images of Na metal electrode evaluated with a unmodified PP separator, a $SiO_2$ nanosphere/separator, and a $SiO_2$ nanosheet/separator respectively.
Figure 5D:
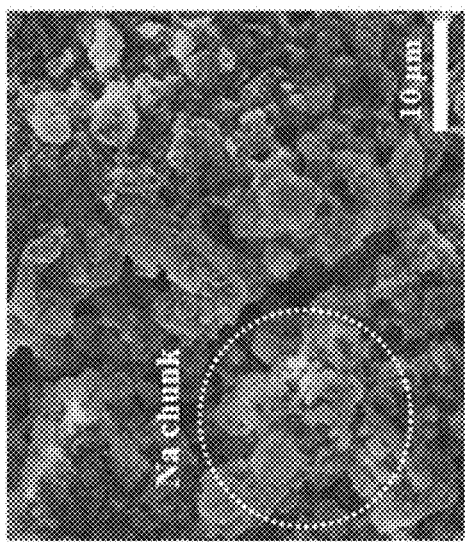
Figure 5F:
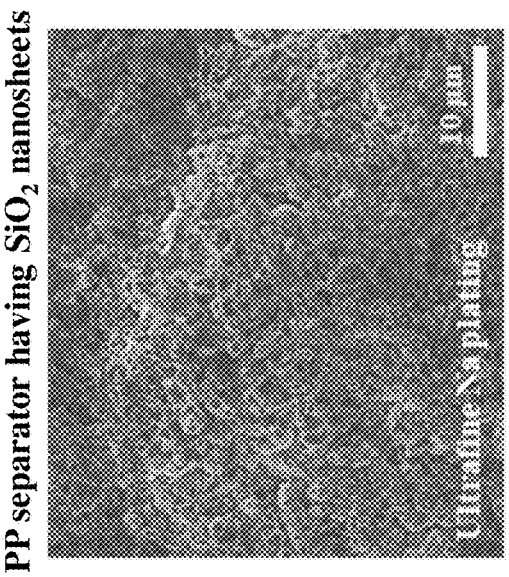

Recently, Na ion batteries have been intensively studied as an alternative to Li ion battery. In addition, the attention for Na metal batteries has also started to grow in parallel with Li metal batteries because of high theoretical capacities, low anode potential, and natural abundance; but, these batteries also have suffered from similar systemic problems as Li metal batteries. To further discover the potentials of separators modified $SiO_2$ nanosheets for Na metal batteries, symmetric cells with identical Na metal film have been fabricated by using 0.5 M $NaPF_6$ in ethylene carbonate/diethyl carbonate (EC:DEC=1:1, v:v) as an electrolyte. The unmodified and modified separators were placed in-between two identical Na metal films as the same way of preparing Li metal batteries. FIGS. 5A through 5F shows cyclic deposition/stripping process of each cell, all the cells being galvanostatically cycled at a constant current density of 0.5 mA $cm^{-1}$ in the cut-off potential ranges of from −2.0 to 2.0 V. FIG. 5A shows the overall voltage profiles of each cell. The cell with a separator modified by $SiO_2$ nanosheet/separator exhibited small overpotential with stable operation for more than 400 h, whereas the voltage ranges of other two cells gradually increased as cycle number of Na deposition and extraction increased. Zoomed-in images of the first few cycles clearly displayed that all the cells were operated with stable outcome with minor variation (FIG. 5B). However, the voltage hysteresis of the cell with a unmodified separator started to increase after 110 h and reached the cutoff voltage around 270 h, indicating the short-circuit of cell (FIG. 5C). When separator modified by $SiO_2$ nanospheres and separator modified by $SiO_2$ nanosheets were employed, cycle performances of both Na metal cells were dramatically improved compared to the reference electrode (unmodified separator). The cell with a separator modified by $SiO_2$ nanosheets delivered excellent cycle stability, more than 400 h, without drastic changes of hysteresis; but, the cell with a $SiO_2$ nanosphere/separator became inoperable at around 350 h due to a short circuit. This is attributed to the main effect of $SiO_2$ nanosheet as metal-ion deposition regulator on relieving high Na-ion flux deposition and suppressing the penetration of Na dendrites against a separator, which could be indirectly confirmed by SEM images (FIGS. 5D through 5F). The surface image of Na metal film after cycles showed more regular and uniform morphology when $SiO_2$ nanosheet/separator was utilized (FIG. 5F), whereas relatively irregular and non-uniform Na chunks or particles were observed when as separator modified by $SiO_2$ nanospheres and unmodified separator were employed (FIGS. 5D through 5E). These results demonstrate the structural effect of a separator modified by $SiO_2$ nanosheets on stabilizing the interfacial reactions and extending the lifetime of Na metal cell. These results are consistent with results obtained on metal batteries.

Figure 6A:
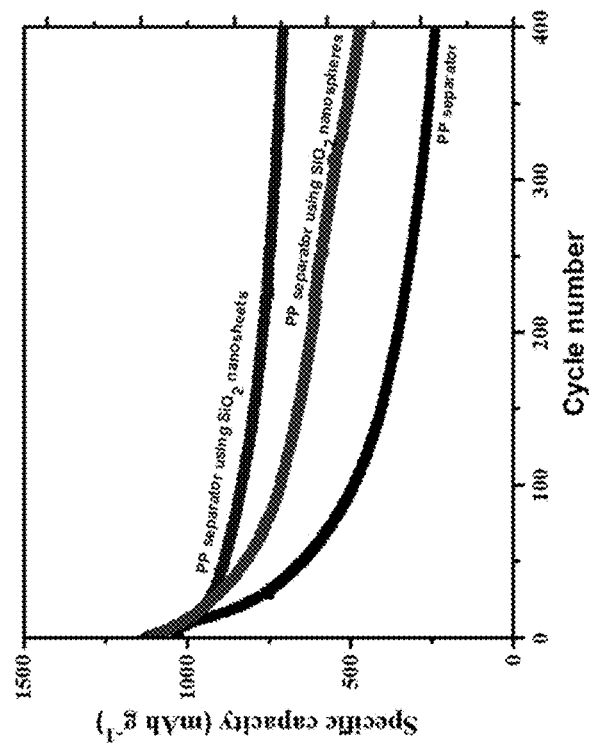
FIGS. 6A and 6B illustrate the electrochemical performances of Li—S batteries showing initial voltage profiles and cycle performances respectively of sulfur cathodes with different separators.
Figure 6B:
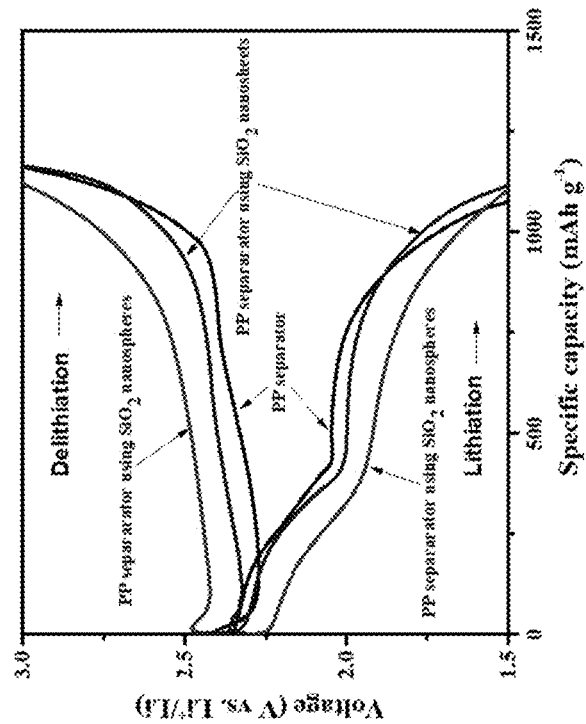

In order to practically demonstrate our designed membrane in next-generation batteries coupled with Li metal electrode, we further evaluated Li—S batteries with an unmodified separator, a separator modified by $SiO_2$ nanospheres, and a separator modified by $SiO_2$ nanosheets. FIGS. 6A and 6B show the electrochemical performances for Li—S batteries. The sulfur cathodes with high sulfur loading (2 mg $cm^{-2}$) were prepared based upon our previous studies. As shown in FIG. 6A, the initial discharge-charge curves of each cell showed almost analogous capacity of around 1100 mAh $g^{-1}$ at 0.5 C rate. However, the gap of peak potentials between the plateau of discharge and charge curves shows different behaviors because the additional layers of $SiO_2$ nano sphere and $SiO_2$ nanosheets with insulating property somewhat delayed Li-ions diffusion across the separator. By contrast, the Li—S cell with a separator modified by $SiO_2$ nanosheets showed slight increase of polarization value, compared to the cell with an unmodified separator, but smaller polarization than that with a separator modified with $SiO_2$ nanospheres. This implies that the separator with the $SiO_2$ nanosheets hardly inhibits the electrochemical reaction between sulfur cathode and Li metal but rather facilitates better reversible reaction in comparison with as separator modified by $SiO_2$ nanospheres. FIG. 6B displays the cycle performances of each cell. When $SiO_2$ nanosphere/separator and $SiO_2$ nanosheet/separator were introduced in-between Li metal and sulfur cathode, cycle performances of both cells were dramatically improved due to the physical blocking of polysulfides within the cathodic side. Especially for the sulfur electrode with a $SiO_2$ nanosheet/separator, it showed excellent cycle retention over 400 cycles compared to the other electrodes. This is attributed to the structural benefits of nanoporous $SiO_2$ nanosheets, which can selectively diffuse the Li ions across membrane but suppress the migration of polysulfide within cathodic area.

Thus, in this disclosure, a multifunctional separator, which is a separator modified with $SiO_2$ nanosheets was demonstrated to suppress metal dendritic growth and hence extend the life cycles of metal batteries. When a separator modified by $SiO_2$ nanosheets separator was employed, the electrochemical performances for both Li metal and Na metal batteries were dramatically improved in comparison with the cells with a conventional separator or a separator modified by $SiO_2$ nanospheres. This is attributed to two main advantages of nanoporous $SiO_2$ nanosheet: (a) uniform distribution of non-uniform Li-ion (or Na-ion) flux throughout the sieve-like structure and (b) effective blocking of propagating Li (or Na) dendrites by the structural benefit of 2D material. In addition, when it was coupled with the sulfur cathode electrode, cycle performances of Li—S batteries were significantly enhanced due to the perm-selective property of $SiO_2$ nanosheets where only Li-ions can pass through the membrane back and forth, except for polysulfides. Different from previous approaches to address the issues associated with metal batteries, the concept of utilizing nanoporous and 2D-structured material in membrane presents a novel strategy to reduce metal dendritic growth and extend the lifetime of metal batteries. In addition, it can be coupled with next-generation batteries (Li—S, Li-air, etc.) requiring Li metal (or Na metal) as an anode and practically increase the energy density of secondary batteries in a facile and effective way. Expansively, the selection of material for designing membrane can be further extended to other types of nanoporous and ionic conductive ceramic materials as well as functional polymers; this will help to advance the development and commercialization of practical metal batteries.

It should be noted that the modification of separator with functional materials via slurry-casting has shown dramatic improvements of Li metal batteries in a facile and cost-effective way. In addition, the conventional slurry coating method can facilitate the large-scale fabrication and broaden the selection of materials, which allows it to be compatible with conventional battery fabrication process.

Figure 7:
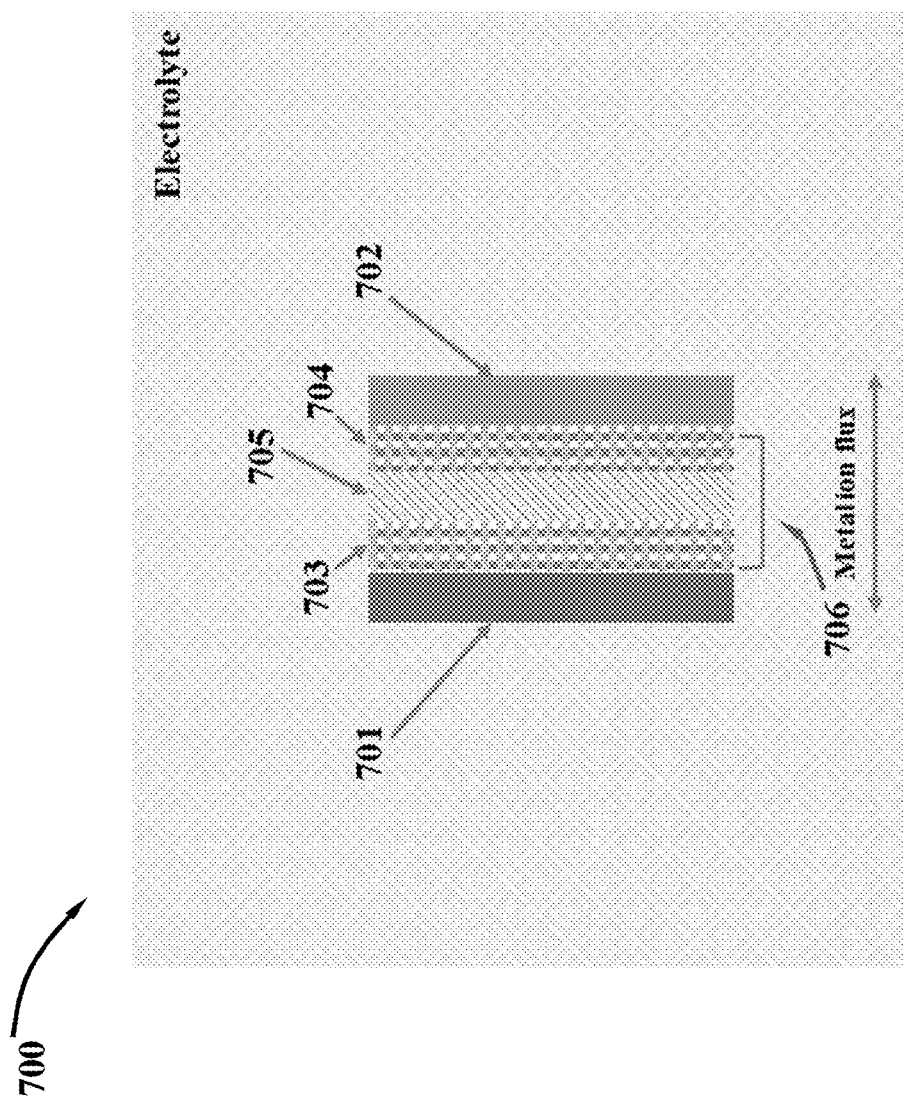
FIG. 7 is a schematic representation of an electrochemical cell containing a metal-ion deposition regulator of this disclosure.

Based on the above description, an electrochemical cell wherein the dendritic growth and propagation of metals such as lithium and sodium can be suppressed can be described. The separator modified with $SiO_2$ nanosheets can be termed a metal-ion deposition regulator of this disclosure. As described above in detail, the metal-ion deposition regulator of this disclosure is capable of regulating the flux and deposition of metal ions in an electrochemical cell. FIG. 7 shows a schematic representation of an electrochemical cell employing a metal-ion deposition regulator of this disclosure. Referring to FIG. 7, 700 represents schematically an electrochemical cell. Referring again to FIG. 7, The electrochemical cell 700 includes an anode 701 made of a metal such as lithium or sodium, a cathode 702, made of one of many materials such as metals, metal oxides, etc., and a metal-ion flux deposition regulator 706. The metal-ion deposition regulator 706, which regulates both the flux of ions and the deposition of ions, comprises two polymer separators 703 and 704 with silicon dioxide ($SiO_2$) nanosheets 705 in contact with and sandwiched between polymer separators 703 and 704. 703 and 704 can be identical in composition and thickness or can have different compositions or thicknesses. In some embodiments of the metal-ion deposition regulator, only one polymer membrane with silicon dioxide nanosheets attached to it can be present. The embodiment of the metal ion deposition regulator 706 of FIG. 7 helps to avoid direct contact of silicon dioxide nanosheets 705 with either electrode 701 or 702. It should be noted that the anode 701, cathode 702, and the metal-ion deposition regulator 706, which includes polymer membranes 703 and 704 and the silicon nanosheets 705, are all immersed in a liquid electrolyte as indicated in FIG. 7. It should be recognized that the electrolyte indicated by label in FIG. 7 is a liquid electrolyte. Many liquid electrolytes suitable for such chemical cells are known to those skilled in the art.

Based on the above description, it is an objective of this disclosure to describe an ion metal-ion deposition regulator regulate the flux and deposition of ions in an electrochemical cell. In one embodiment of the disclosure, the ions are metal ions, such as but not limited to, lithium ions and sodium ions. In such an embodiment, the metal-ion deposition regulator contains two membranes and a plurality of two-dimensional porous nanosheets in contact with the two membranes and sandwiched between the two membranes. In this configuration the separator forms a metal-ion deposition regulator capable of distributing flux of metal ions passing through the separator and regulating the deposition of the metal ions onto an electrode of an electrochemical cell employing the metal-ion deposition regulator as a separator or part of a separator.

In some embodiments of the metal-ion deposition regulator of this disclosure, the two membranes are made of a polymer. Polymers suitable for the membranes include but not limited to polyethylene, polypropylene, polyurethane, poly (tetrafluoroethylene), and polyvinyl chloride. In some embodiments, the thickness of the either of the two membranes which are part of the metal-ion deposition regulator mentioned above is in the range of 10-50 micrometers. In some embodiments of the metal-ion deposition regulator of this disclosure, the two-dimensional nanosheets are made of an inorganic material. Inorganic materials suitable for this purpose include but not limited oxides and nitrides. Non-limiting examples of oxides or nitrides suitable for this purpose are zinc oxide (ZnO), silicon dioxide ($SiO_2$), aluminum oxide ($Al_2O_3$), and zirconium oxide ($ZrO_2$), calcium nitride (CaN), boron nitride (BN), aluminum nitride (AlN) and titanium nitride (TiN). The size of pores in the two-dimensional porous nanosheets can be in the nonlimiting range of 5-30 nm, while the thickness of the nanosheets can be in the range of 5-40 nm. A non-limiting range for the substrate of the metal-ion deposition regulator of this disclosure is 10-30 μm. A non-limiting range for the thickness of the the metal-ion deposition regulator of this disclosure is in the range of 15-90 μm.

It is also an objective of this disclosure to describe an electrochemical cell utilizing the metal-ion deposition regulator described in this disclosure. Such an electrochemical cell includes an anode, a cathode, a liquid electrolyte and metal-ion deposition regulator containing two membranes and a plurality of two-dimensional porous nanosheets sandwiched between the two membranes, wherein the metal-ion deposition regulator capable of distributing flux of metal ions passing through the metal-ion deposition regulator and regulating the deposition of the metal ions onto an electrode (anode or cathode) of the electrochemical cell. Non-limiting example of metal ions of an electrochemical cell employing the metal-ion deposition regulator of this disclosure are lithium ions and sodium ions. In some embodiments of the electrochemical cell of this disclosure, the two membranes are made of a polymer and the two-dimensional porous nanosheets are made of an oxide or a nitride. Polymers suitable for the membranes of the electrochemical cell of this disclosure include, but not limited to, polyethylene, polypropylene, polyurethane, poly (tetrafluoroethylene), and polyvinyl chloride. A non-limiting example of an oxide suitable for the two-dimensional porous nanosheets is silicon dioxide.

It is yet another objective of this disclosure to describe method of making a metal-ion deposition regulator to regulate the flux and deposition of metal ions in an electrochemical cell. The method includes various steps as described below: dispersing graphene oxide particles into a mixture of deionized water and ethanol (for example by sonication); adding a silicon-containing inorganic material and quantity of a bonding agent to promote bonding between the graphene oxide particles and the silicon-containing inorganic material to form a suspension containing the graphene oxide particles, silicon-containing inorganic material, water, and the bonding agent; adding ammonia solution to the suspension causing precipitation of a composite containing the graphene oxide particles, silicon-containing inorganic material and the bonding agent; extracting the composite by removing the ammonia solution and water; centrifuging the suspension containing the precipitate, water and ammonia; drying the composite to form a dry composite; heating the dry composite to a temperature range of 500-800 C for 6-24 hours resulting in the removal of the graphene oxide leaving behind porous nanosheets of silicon dioxide; mixing the nanosheets with a polymeric binder and an organic solvent to result in a slurry; coating a first membrane made of a polymer with the slurry; heating the first membrane coated with the slurry in at temperature range of 30-50° C. for 4-24 hours to form dried porous nanosheets attached to the first membrane made of a polymer; and sandwiching the dried porous nanosheets between the first membrane made of a polymer and a second membrane made of a polymer to be in contact with the two membranes.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A metal-ion deposition regulator to regulate the flux and deposition of metal ions in an electrochemical cell, the metal-ion deposition regulator comprising a separator placed between two electrodes, wherein the separator contains two membranes made of a polymer in contact with a liquid electrolyte of the electrochemical cell and a plurality of two-dimensional porous nanosheets sandwiched between and in direct contact with the two membranes, wherein the separator does not serve as an electrolyte;
the ions going through the separator first pass through one of the two membranes, then through the two-dimensional porous nanosheets and then through other membrane of the two membranes; and
flux of metal ions passing through the separator and depositing onto an electrode of an electrochemical cell is distributed across a surface of the electrode, leading to uniform deposition and extraction of the metal ions during repeated charge-discharge-cycles of the electrochemical cell.

2. The metal-ion deposition regulator of claim 1, wherein the polymer is one of polyethylene, polypropylene, polyurethane, poly (tetrafluoroethylene), and polyvinyl chloride.

3. The metal-ion deposition regulator of claim 1, wherein the two-dimensional porous nanosheets are made of an inorganic material.

4. The metal-ion deposition regulator of claim 3, wherein the inorganic material is an oxide.

5. The metal-ion deposition regulator of claim 4, wherein the oxide is one of zinc oxide (ZnO), silicon dioxide ($SiO_2$), aluminum oxide ($Al_2O_3$), and zirconium oxide ($ZrO_2$.).

6. The metal-ion deposition regulator of claim 5, wherein the oxide is silicon dioxide ($SiO_2$).

7. The metal-ion deposition regulator of claim 4, wherein the inorganic material is a nitride.

8. The metal-ion deposition regulator of claim 6, wherein the nitride is one of calcium nitride, boron nitride, aluminum nitride and titanium nitride.

9. The metal-ion deposition regulator of claim 1, wherein the thickness of the two-dimensional porous nanosheets is in the range of 5-40 nm.

10. The metal-ion deposition regulator of claim 1, wherein the thickness of either of the two membranes is in the range of 10-50 μm.

11. The metal-ion deposition regulator of claim 1, wherein the thickness of the metal-ion deposition regulator is in the range of 15-90 μm.

12. The metal-ion deposition regulator of claim 1, wherein the metal ions are lithium ions or sodium ions.

* * * * *